(12) United States Patent
Elias et al.

(10) Patent No.: US 10,691,882 B2
(45) Date of Patent: Jun. 23, 2020

(54) TECHNIQUES FOR USING A SPREADSHEET AS A COMPUTE ENGINE IN AN ONLINE DATA MANAGEMENT SYSTEM

(71) Applicant: Mercatus, Inc., San Mateo, CA (US)

(72) Inventors: Abraham Elias, Lakewood Ranch, FL (US); Jason Adams, Cincinnati, OH (US); Hanno Benjamin Harms, El Cerrito, CA (US)

(73) Assignee: Mercatus, Inc., San Mateo, CA (US)

( * ) Notice: Subject to any disclaimer, the term of this patent is extended or adjusted under 35 U.S.C. 154(b) by 0 days.

(21) Appl. No.: 15/873,675

(22) Filed: Jan. 17, 2018

(65) Prior Publication Data

US 2019/0220509 A1 Jul. 18, 2019

(51) Int. Cl.
| | | |
|---|---|---|
| *G06F 40/18* | (2020.01) | |
| *G06F 7/02* | (2006.01) | |
| *G06F 17/10* | (2006.01) | |
| *G06F 40/174* | (2020.01) | |

(52) U.S. Cl.
CPC .............. *G06F 40/18* (2020.01); *G06F 7/02* (2013.01); *G06F 17/10* (2013.01); *G06F 40/174* (2020.01)

(58) Field of Classification Search
CPC ...... G06F 17/10; G06F 17/243; G06F 17/246; G06F 7/02
USPC ................................. 715/212, 217, 219, 220
See application file for complete search history.

(56) References Cited

U.S. PATENT DOCUMENTS

| | | | | |
|---|---|---|---|---|
| 5,272,628 A | * | 12/1993 | Koss ..................... | G06F 40/177 715/205 |
| 5,418,898 A | * | 5/1995 | Zand ....................... | G06F 40/18 715/255 |
| 6,097,725 A | * | 8/2000 | Glaise ................. | H04L 12/5601 370/392 |
| 6,631,497 B1 | | 10/2003 | Jamshidi | |
| 10,437,428 B2 | * | 10/2019 | Callaghan ........... | G06F 3/04842 |
| 2003/0145051 A1 | * | 7/2003 | Bates .................... | G06F 40/166 709/204 |
| 2005/0015379 A1 | * | 1/2005 | Aureglia ................. | G06F 40/18 |

(Continued)

OTHER PUBLICATIONS

"map;" Microsoft Computer Dictionary; 2002; Microsoft Press; Fifth Edition; p. 328.*

(Continued)

*Primary Examiner* — Andrew R Dyer

(74) *Attorney, Agent, or Firm* — Hickman Palermo Becker Bingham LLP; Adam C. Stone

(57) ABSTRACT

Computer-implemented techniques for using a spreadsheet as a compute engine in an online data management system. In one embodiment, for example, a computer-implemented method comprises the operations of: automatically causing first data items of a first named range triad to be set in a first named range of a spreadsheet; after the first data items are set in the first named range, automatically causing a spreadsheet program to calculate a cell value of the spreadsheet that is derived from one or more of the first data items as set in the spreadsheet; and after the cell value is calculated, automatically obtaining second data items from a second named range of the spreadsheet, the second data items including the cell value calculated. By doing so, quantitative models can be maintained in spreadsheets yet the data on which the models operate can be managed using an online data management system.

17 Claims, 13 Drawing Sheets

(56) References Cited

U.S. PATENT DOCUMENTS

| | | | |
|---|---|---|---|
| 2006/0050984 A1* | 3/2006 | Tilton | G06K 9/0063 |
| | | | 382/275 |
| 2007/0022128 A1* | 1/2007 | Rothschiller | G06F 40/18 |
| 2008/0016041 A1 | 1/2008 | Frost et al. | |
| 2008/0306983 A1 | 12/2008 | Singh | |
| 2011/0126092 A1* | 5/2011 | Harris | G06F 40/174 |
| | | | 715/256 |
| 2011/0202823 A1* | 8/2011 | Berger | G06F 40/18 |
| | | | 715/217 |
| 2014/0188802 A1* | 7/2014 | Branton | G06F 9/543 |
| | | | 707/634 |
| 2016/0098415 A1 | 4/2016 | Mejeoumov et al. | |
| 2016/0142488 A1* | 5/2016 | Adler | G06F 17/246 |
| | | | 709/217 |
| 2016/0378842 A1 | 12/2016 | Demonsant et al. | |

OTHER PUBLICATIONS

Henrik Schiffner; XML & ZIP: Explore Your Excel Workbooks File Structure; Jan. 9, 2017; Professor-Excel.com; pp. 1-25.*

The International Searching Authority, "Search Report" in application No. PCT/US2019/013086, dated Apr. 23, 2019, 13 pages.

* cited by examiner

FIG. 7

|     | A | B | C | D | E | F | G | H | I | J | K | L | M | N | O | P |
|-----|---|---|---|---|---|---|---|---|---|---|---|---|---|---|---|---|
| 1   |   |   |   |   |   |   |   |   |   |   |   |   |   |   |   |   |
| 2   |   |   |   |   |   |   |   |   |   |   |   |   |   |   |   |   |
| 3   |   |   |   |   |   |   |   |   |   |   |   |   |   |   |   |   |
| 4   |   |   |   |   |   |   |   |   |   |   |   |   |   |   |   |   |
| 5   |   |   |   |   | "C0" | "C1" |   | "C3" | "C4" | "C5" |   |   | "C8" |   |   |   |
| 6   |   |   | "R0" |   | "00" | "01" |   | "03" | "04" | "05" |   |   |   |   |   |   |
| 7   |   |   | "R1" |   | "10" | "11" | "DEF" | "13" | "14" | "15" | "HGI" |   "789" |   |   |   |
| 8   |   |   | "R2" |   | "20" | "21" |   | "23" | "24" | "25" |   |   |   |   |   |   |
| 9   |   |   | "R3" |   |   |   |   |   |   | "A12" |   |   |   |   |   |   |
| 10  |   |   |   |   |   |   |   |   |   |   |   |   |   |   |   |   |
| 11  |   |   |   |   |   |   |   |   |   |   |   |   |   |   |   |   |
| 12  |   |   |   |   |   |   |   |   |   |   |   |   |   |   |   |   |
| 13  |   |   |   |   |   |   |   |   |   |   |   |   |   |   |   |   |
| 14  |   |   |   |   |   |   |   |   |   |   |   |   |   |   |   |   |
| 15  |   |   |   |   |   |   |   |   |   |   |   |   |   |   |   |   |

700

710 → (R0-R3 column)
720 → (C4 cell)
730 → (24 cell)

FIG. 8

| | A | B | C | D | E | F | G | H | I | J | K |
|---|---|---|---|---|---|---|---|---|---|---|---|
| 1 | | | | | | | | | | | |
| 2 | | | | | | | | | | | |
| 3 | | | | | | | | | | | |
| 4 | | | | | Q1-2016 | Q2-2016 | Q3-2016 | Q4-2016 | Q1-2017 | | |
| 5 | | | | | | | | | | | |
| 6 | | | "APAC" | | "$1,001" | "$1,011" | "$1,021" | "$1,031" | "$1,041" | | |
| 7 | | | "America" | | "$1,101" | "$1,111" | "$1,121" | "$1,131" | "$1,141" | | |
| 8 | | | "ANZ" | | "$1,201" | "$1,211" | "$1,221" | "$1,231" | "$1,241" | | |
| 9 | | | | | | | | | | | |
| 10 | | | | | | | | | | | |
| 11 | | | | | | | | | | | |

800

810 → "APAC"

820 → Q3-2016

830 → "$1,221"

TECHNIQUES FOR USING A SPREADSHEET AS A COMPUTE ENGINE IN AN ONLINE DATA MANAGEMENT SYSTEM

TECHNICAL FIELD

The present invention relates generally to online data management systems, and more particularly, to an improved online data management system that leverages a spreadsheet as a compute engine in a flexible manner.

BACKGROUND

Computers have become indispensable in storing, organizing, and analyzing information. One of the earliest ways for users to do this was by using a spreadsheet. Over time, many spreadsheet products have been developed that allow users to store, organize, and analyze information. The continuing growth of information economy creates a demand for more powerful spreadsheets.

The spreadsheet products have evolved over time. Initially, spreadsheets comprised a simple "grid" of cells containing user-entered numeric or text data and the results of basic arithmetic and mathematical functions. Modern spreadsheets allow user to adjust stored values and observe the effects on calculated or derived values. This makes spreadsheets useful for quickly investigating multiple, competing hypothetical scenarios without manual recalculation. Modern spreadsheets can have multiple interacting sheets and can display data in graphical form (e.g., charts), as well as text and numeric information. In addition to supporting basic arithmetic and mathematical functions, modern spreadsheets provide built-in functions and support third-party plugin functions for performing complex financial and statistical operations.

While spreadsheets are widely-used for quantitative modeling, they have deficiencies. The deficiencies include reliability as measured by the number of spreadsheets that contain errors. Other deficiencies include lack of auditing and revision control, and lack of security. The sheer volume of spreadsheets that may exist in an organization without adequate security, auditing, and error control can become overwhelming. For these and other reasons, collaboration on a spreadsheet can be tedious and error prone.

Despite these deficiencies, spreadsheets continue to be widely-used within organizations (e.g., businesses and corporations) for important quantitative modeling tasks. This continued use is not with the risk associated with deriving a materially incorrect value from a spreadsheet that is used to make a related domain decision such as, for example, the valuation of an asset, the determination financial accounts, the calculation of medicinal doses, the size of a load-bearing beam for structural engineering, etc. The risk arises principally from the action or inaction of individuals such as, for example, inputting erroneous or fraudulent data values in a spreadsheet, or omitting relevant updates to a spreadsheet such as, for example, out of date exchange rates.

The techniques herein address these issues.

SUMMARY

The appended claims may serve as a summary of the invention.

BRIEF DESCRIPTION OF THE DRAWINGS

In the drawings:

FIG. 7 depicts an example spreadsheet.

FIG. 8 depicts an example spreadsheet.

DETAILED DESCRIPTION

Figure 1:
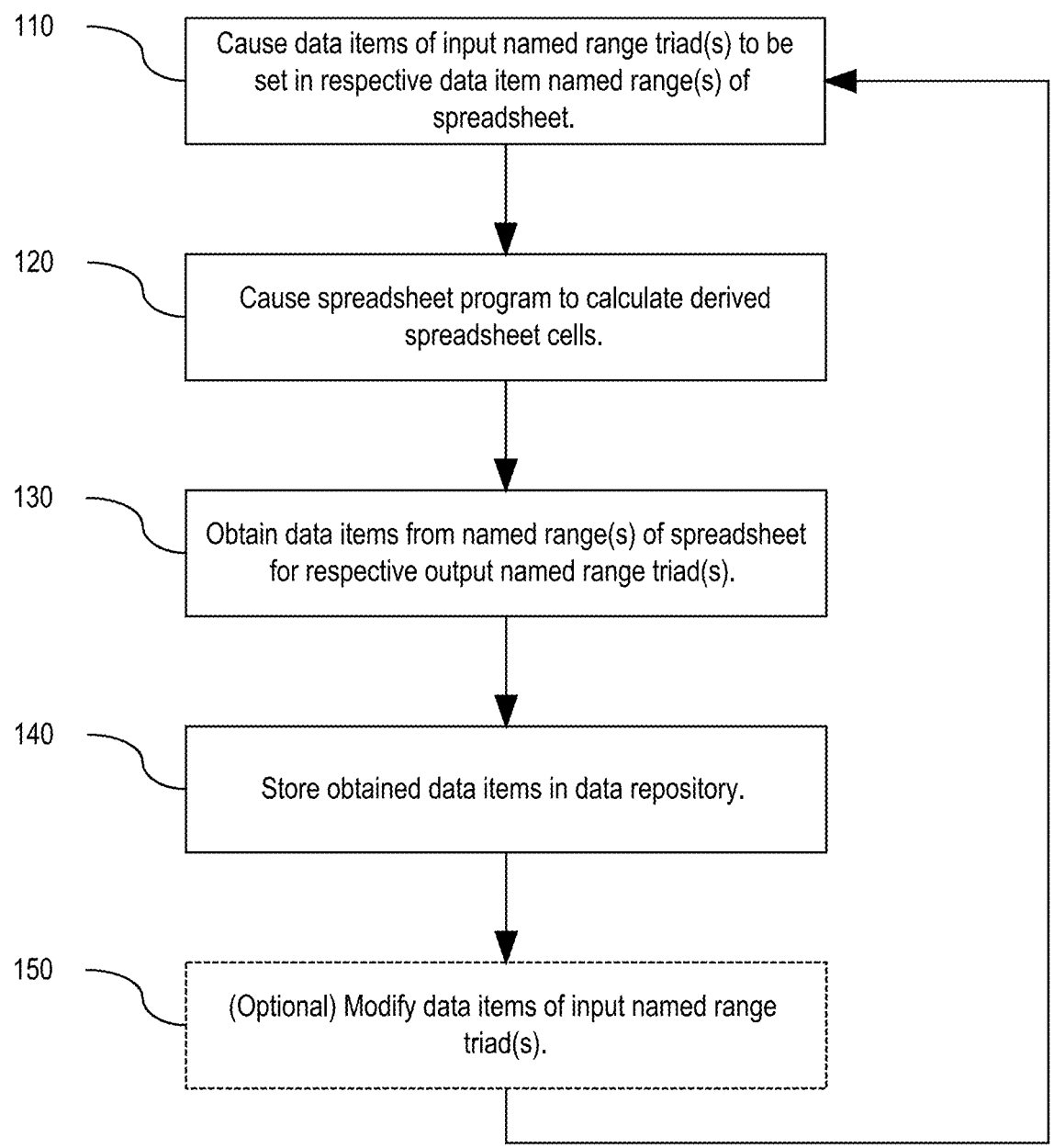
FIG. 1 depicts an example process for using a spreadsheet as a compute engine in an online data management system.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form to avoid unnecessarily obscuring the present invention.

General Overview

Online data management systems exist to help organizations manage their data. Such systems provide improved data reliability and accuracy for more accurate reporting, compliance, and decision making by eliminating data silos and centralizing data in a single online data and document repository. Such systems typically facilitate access to the centralized repository over a data network using a web browser application or a mobile application. Such systems provide a variety of data management features such as, for example, configurable data access controls, data or document version control, data change auditing, data validation, workflow tools, automated notifications and alerts triggered by data changes, reporting, analytics, data dashboards, etc.

Despite the benefits that online data management systems offer and the deficiencies of spreadsheets, organizations continue to use spreadsheets as the source of truth for their quantitative models. This use is expected to continue given widespread user familiarity with spreadsheet programs. In some cases, a spreadsheet encapsulates an organization's domain-specific quantitative model that has been carefully cultivated over years by the organization. Such an organization may not be willing to discontinue use of spreadsheets for their complex, domain-specific quantitative modeling needs.

Organizations would appreciate technical solutions that allow them to maintain their quantitative models in spreadsheets yet, at the same time, avail themselves to the benefits of managing their data using an online data management system. In some embodiments, the techniques herein leverage the domain logic of a quantitative model encapsulated in a spreadsheet as a compute engine within an online data management system. With the techniques, domain-specific quantitative models can continue to be encapsulated in spreadsheets yet the data on which the models operate can be managed separate from (outside) the spreadsheets using an online data management system.

In some embodiments, the techniques improve upon existing techniques for managing data in an online data management system by employing flexible synchronization of data between a centralized, online data repository and named ranges in spreadsheets. As used herein, a "named range" refers to a range of cells of a spreadsheet that is given a name by which the range of cells is referenced. For example, the cell range E3:H5 (which consists of a table of 12 cells having 4 columns and 3 rows) might be given the name "MyData". That name may be used in the spreadsheet to refer the cell range in lieu of using cell coordinates. For example, SUM(MyData) might be used to compute the sum of all cells instead of using SUM(E3:H5).

According to some embodiments, synchronization of data might commence by someone (e.g., Abe as a user) indicating they would like to calculate, for example, the projected annual EBITDA (earnings before interest taxes and depreciation) based on recently obtained sales figures for Q2 according to a formula for calculating the projected EBITDA that is encapsulated in a spreadsheet. This might be beneficial if Abe (or the organization Abe works for) has high confidence in the accuracy of the spreadsheet formula and/or does not want to expend the effort to re-implement the formula outside of the spreadsheet.

Assuming the cells of the spreadsheet for receiving the Q2 sales figures and the cell storing the projected EBITDA are identified by respective named ranges, then, according to some embodiments, the synchronization herein will automatically input the sales figures obtained from Abe and stored in the data repository into the appropriate input cells of the spreadsheet, will automatically cause the spreadsheet program to calculate the projected EBITDA using the input sales figures, and, will automatically obtain the calculated projected EBITDA from the appropriate output cell and store the obtained value in the data repository.

According to some embodiments, the synchronization would still be successful if the "shape" of the spreadsheet cells within a named range mismatch the shape of the input data. For example, the synchronization would still operate properly if the shape of the cells within the named range for the Q2 sales figures differs from the shape of the sales figures provided by Abe.

As used herein, the term "shape" is used to refer to the number of rows and the number of columns of data that is logically organized as a table. For example, if the named range for Q2 sales figures has cells for four salespersons (i.e., the shape of the named range is 4 rows/columns by 1 column/row), and Abe provides sales figures for only three (i.e., the shape of the input data is 3 rows/columns by 1 column/row), the synchronization will automatically cause the spreadsheet program to calculate the projected EBITDA using the three input sale figures and whatever sales figure, if any, already exists in the spreadsheet for the fourth salesperson. The synchronization will also still work if the shape of the input data is larger than the shape of the target named range. However, in this case, some of the input data values will not be considered in the calculation of the projected EBITDA.

As another example, a target named range within a spreadsheet might not be static and might change over time. For example, each quarter, a curator or author of the spreadsheet might add a new column or row of cells for storing that quarter's sales figures to a "quarterly sales figures" named range of the spreadsheet. For example, after the sales figures for "Q1-2017" are available, a new column or row of cells might be added to the named range that already contains sales figures for "Q4-2016", "Q3-2016", etc. Other cells of the spreadsheet (e.g., a cell containing a formula) might also be configured by the curator/author to refer to the new column or row.

The synchronization techniques herein allow the shape of target named ranges to change and referencing formulas to be modified, yet still successfully synchronize the data. As such, the quantitative models in spreadsheets can evolve over time, independent of the particular data on which the models operate, which can be stored external to the spreadsheets (e.g., in a centralized, online data repository) and synchronized with the spreadsheets on an as needed basis to leverage the quantitative models as a compute engine within an online data management system.

As used herein, the term "external" as in data stored external to a spreadsheet refers to data that is not stored in the data container containing the spreadsheet itself (e.g., not stored in the spreadsheet file). It should be noted data stored external to a spreadsheet is still considered externally stored data with respect to the spreadsheet even if a copy of the data is stored the spreadsheet such as during the synchronization process described herein.

In some embodiments, a named range "triad" is stored external to a spreadsheet to facilitate synchronization of data with a "target" named range of the spreadsheet in a cell coordinate-free manner. The triad is composed of a set of one or more column headers, a set of one or more row headers, and a set of data items. For example, the columns headers might identify sales quarters (e.g., "Q3-2016," "Q4-2016," "Q1-2017," etc.), the row headers might identify sales regions (e.g., "America," "Benelux", "CEMA," etc.), and each data item might specify a sales figure for a particular one of the sales quarters and a particular one of the sales regions.

As mentioned, the named range triad may be stored external to the spreadsheet. For example, the named range triad could be stored in a centralized, online data repository or other data container that does not contain the spreadsheet. By storing the named range triad external to the spreadsheet, it can be managed without requiring the spreadsheet. For example, the data of a named ranged triad could be managed (e.g., row-headers, column-headers, and/or data items added and/or removed from the named range triad) using features of an online data management system.

In some embodiments, the named range triad also encompasses a row and column header mapping for each of the data items in the triad. In particular, the row and column header mapping for a data item identifies one of the row headers of the triad and one of the column headers of the triad. In some embodiments, the row and column header mappings are used to assign the data items of the triad to spreadsheet cells in flexible, spreadsheet cell coordinate-free manner.

In some embodiments, the row and column header mappings are used to assign data items of the triad to cells of a logical table that represent the cells of the target named range. Once the data items are assigned to the cells of the logical table, then the assignments are used to set the data items in the corresponding cells of the target named range. This facilitates fewer spreadsheet program operations to set the data items in the named range than would otherwise be required if the data items are individually set in the cells of the target named range on a individual cell by individual cell basis.

In some embodiments, after data items have been assigned to cells of the logical table based on their row and header column mappings, the assigned data items are caused to be set in the target named range based on the assignments. For example, setting the assigned data items in the target named range might be caused by invoking a single set operation of a spreadsheet program that operates on the spreadsheet, as opposed to invoking the set operation for each assigned data item individually on an individual cell by individual cell basis, thereby improving the performance of the synchronization.

Further, some embodiments include causing cells of the spreadsheet outside the target named range that refer to cells within the target named range to be calculated, after the assigned data items are set in the target named range. This could include using an application programming interface of the spreadsheet program to cause the calculation.

In some embodiments, the synchronization includes using a named range triad to obtain data items from the spreadsheet for storage in the data repository. For example, after causing a spreadsheet to calculate formulas, the synchronization could store a named range triad in a centralized, online data repository based on a set of calculated data items obtained from a spreadsheet.

Various embodiments of the synchronization techniques herein include automatically inputting data stored external to a spreadsheet into named ranges of the spreadsheet, automatically causing formulas of the spreadsheet to be calculated based on the input data, and automatically obtaining the values of calculated cells for storage in a centralized, online data repository where they are accessible to useful features of an online data management system. The synchronization may be repeated as often as desired including modifying the input data before a synchronization is initiated. In this way, modifications to the data items can be managed outside of the spreadsheet (e.g., via an online data management system), yet the spreadsheet is still leveraged as a compute engine to calculate values derived from the managed input data. Also, the online data management system may use the externally stored input data and the derived values obtained from spreadsheets to provide various data management features such as data dashboards, reporting, analytics, etc.

Example Process for Named Range-Based Synchronization

FIG. 1 depicts an example process 100 for using a using a target spreadsheet as a compute engine in an online data management system. Some embodiments of process 100 relate synchronizing data stored in a centralized, online data repository of the online data management system to and from named ranges of the target spreadsheet.

In brief, data items of named range triads stored in the data repository configured as "input" named range triads for the target spreadsheet are caused to be set 110 in respective named ranges of the spreadsheet. Then, formulas of the target spreadsheet are caused to be calculated 120. This causes any "derived" spreadsheet cells that refer to (are derived from) cells (e.g., via formulas) set in operation 110 to be calculated based on the set values. Then, data items of "output" named range triads are obtained 130 from the respective named ranges of the target spreadsheet and stored 140 in the data repository. This completes a synchronization cycle for the target spreadsheet. The cycle may be repeated as often as desired including modifying 150 data items of input named range triads before a synchronization cycle is initiated. The cycle may also be performed for different target spreadsheets and/or different input and/or output named range triads.

Returning to the top of process 100, the process proceeds by causing data items of input named range triad(s) to be set 110 in respective named ranges of a target spreadsheet. The input named range triads(s) set in the target spreadsheet may be stored in a centralized, online data repository of an online data management system. The data repository may be a relational database or other suitable data container.

In some embodiments, named range triads are stored in the data repository in a programming language-independent data format that supports basic data types such as numbers, strings, Boolean, arrays, associative arrays, etc. For example, the data format might by JavaScript Object Notation (JSON), eXtensible Markup language (XML), YAML, or the like.

Named Range Triad

Figure 2:
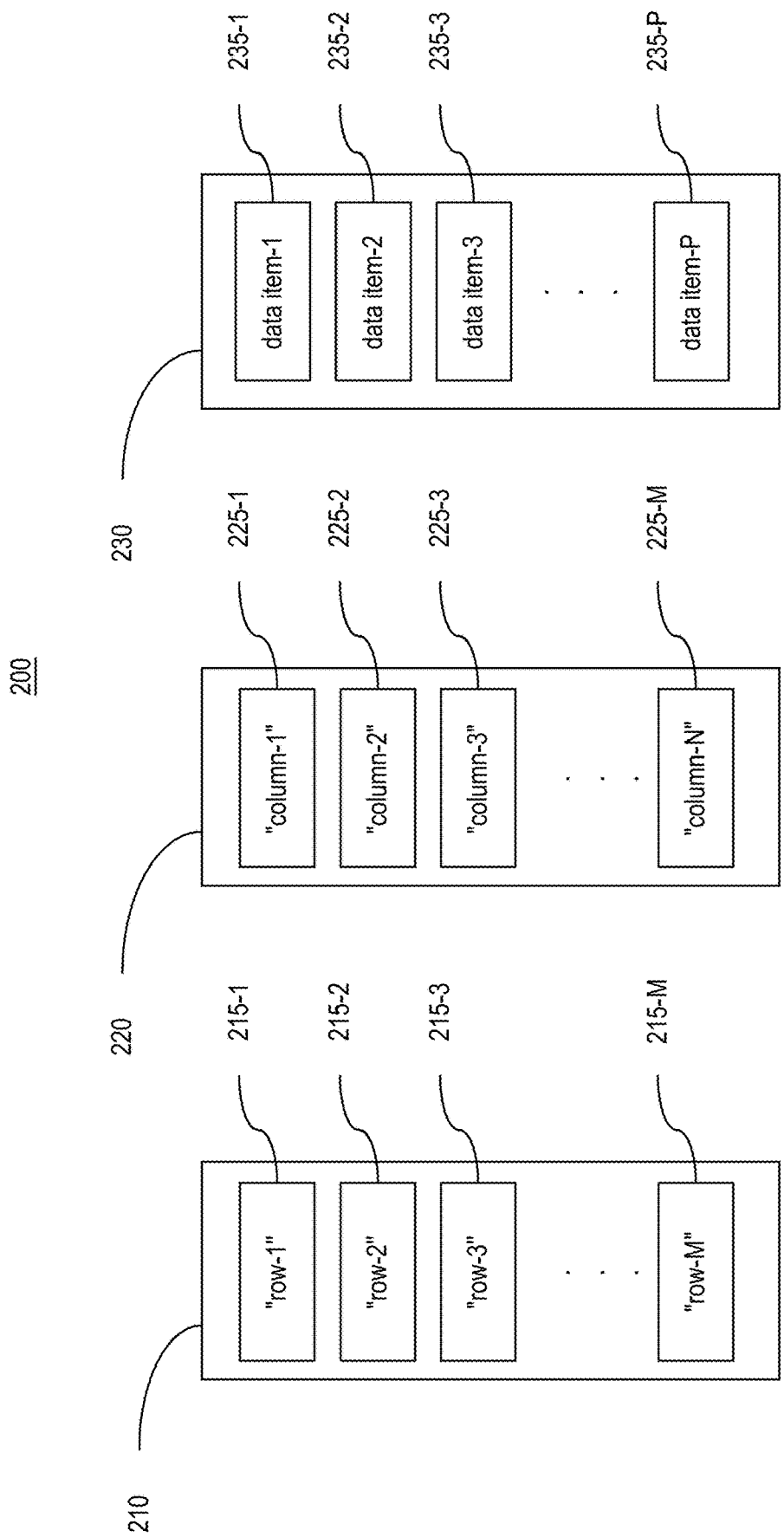
FIG. 2 depicts an example named range triad.

FIG. 2 depicts an example named range triad 200 that may be stored in a data repository. The triad 200 is composed of a set 210 of row headers 215, a set 220 of column headers 225, and a set 230 of data items 235.

In this example, there are M number of row headers 215, N number of column headers 225, and P number of data items 235 in the triad 200. M, N, and P may be equal or different from each other. In particular, there is no requirement that the number M of row headers 215 and the number N of column headers 225 be equal, or that the number P of data items 235 be equal to the number M of row headers 215 times the number N of column headers 225.

According to some embodiments, if the triad 200 does not provide a data item 235 for every unique row header 215 and column header 225 pair (irrespective of the order of the row header 215 and the column header 225 in the pair), then the triad is "sparse". If at least one data item 235 of the triad 200 does correspond to any of the unique row header 215 and column header 225 pairs, then the triad 220 is "over dense". If each and every data item 235 of the triad 200 corresponds to one unique row header 215 and column header 225 pair, then the triad 200 is "fully dense". Note that a triad 200 can be both sparse with respect to some row and column header pairs and over dense with respect to some data items.

According to some embodiments, the triad 200 may be synchronized according to techniques herein regardless if the triad 200 is fully dense or sparse and/or over dense. This provides flexibility in managing the externally stored data items in the data repository via the online data management system because it is not necessary for the shape of the externally stored named range triad stored in the data repository to exactly match the shape of the corresponding named ranges of the target spreadsheet in order for synchronization to successfully occur.

The set 210 of row headers 215 represents a set, class, or group of items. For example, the set 210 of row headers 215 might represent a set, class, or group of geographic sales regions of an organization. Each of the row headers 215 identifies a particular item in the set, class, or group of items represented by the set 210. For example, if the set 210 represents geographic sales regions of an organization, the row headers 215 might include "APAC,", "America", "EMEA," etc.

The set 220 of column headers 225 represents a set, class, or group of items orthogonal to the set, class, or group of items represented by the set 210 of row headers 215. For example, the set 220 of column headers 225 might represent a set of sales quarters for the organization. Each of the column headers 225 identifies a particular item in the set, class, or group of items represented by the set 220. For example, if the set 220 represents sales quarters for the organization, then column headers 225 might include "Q1-2016," "Q2-2016," Q3-2016," etc.

Each data item 235 is a value for one unique row header 215 and column header 225 pair of the triad 200. For example, each data item 235 may be a total sales amount during a particular sales quarter represented by one of the row headers 215 within a particular geographic sales region represented by one of the column headers 225. As can be seen from this example, named ranged triad 200 is useful to storing data that can be logically organized as a table.

Synchronization Metadata

Figure 3:
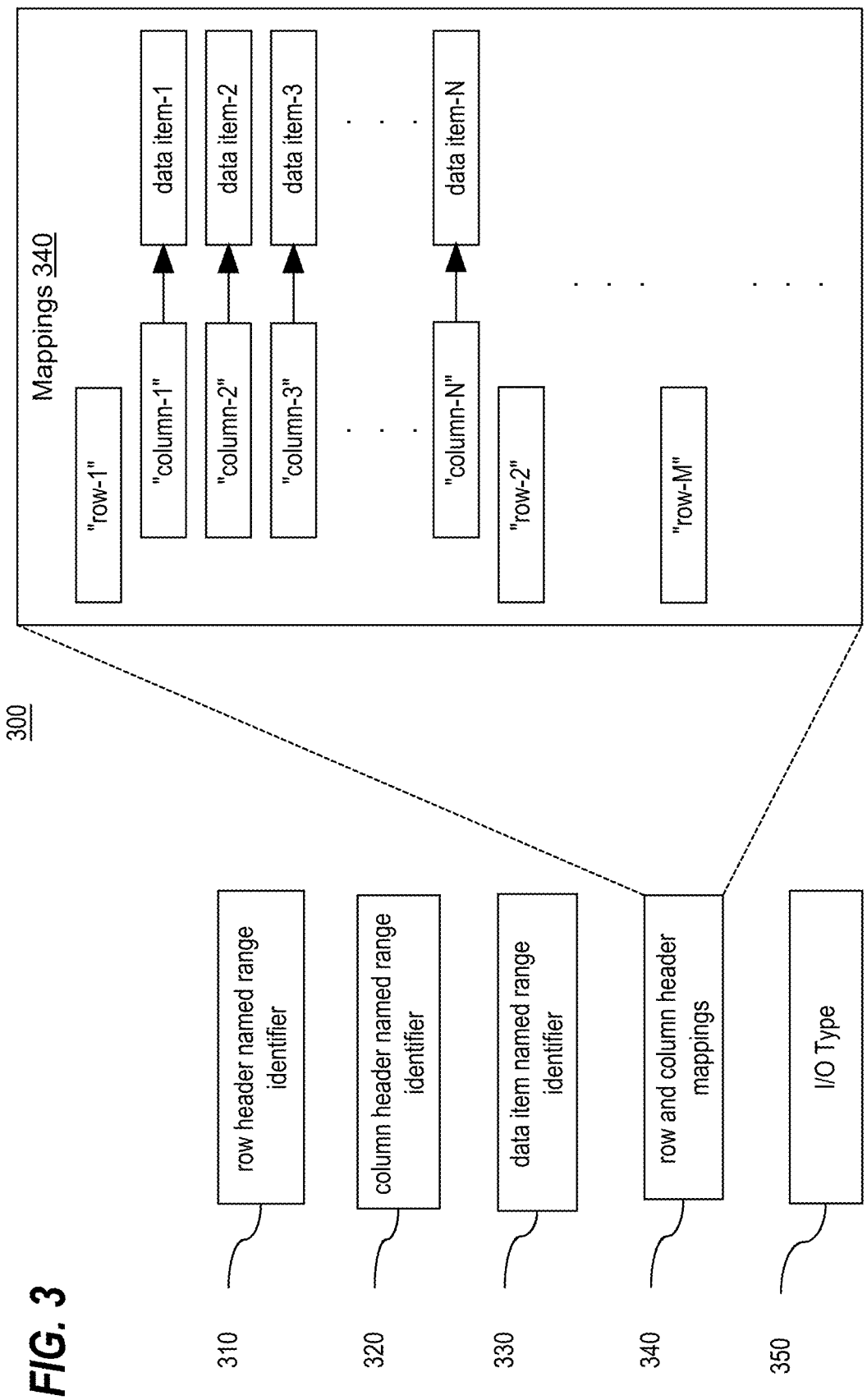
FIG. 3 depicts example synchronization metadata.

A named range triad stored in the data repository may be associated with synchronization metadata that facilitates causing data items of an input named range triad to be set 110 in a respective named range of the target spreadsheet. FIG. 3 depicts example synchronization metadata 300 that may be associated with a named range triad stored in the data repository. For example, the metadata 300 may also be stored in the data repository. As such, the metadata 300 may be stored external to the target spreadsheet.

In some embodiments, the metadata 300 for a named range triad includes an identifier 310 of a named range in the target spreadsheet where the set of row headers of the named range triad are stored, an identifier 320 of a named range in the target spreadsheet where the set of column headers of the named ranged triad are stored, an identifier 330 of a target named range for inputting and/or outputting data items of the named range triad, a set of row and column header mapping 340 between the data items of the named range triad and unique pairs of row and column headers of the named range triad, and a input-output configuration 350 for the named range triad.

The input-output configuration 350 specifies whether the named range triad is an input named range triad, an output named range triad, or both an input and an output named range triad. If an input named ranged triad, data items of the triad are set in the target named range before calculation of the spreadsheet. If an output named ranged triad, data items in the target named range after calculation of the spreadsheet are obtained and stored as part of the named ranged triad. If both an input and output named ranged triad, then both data items of the triad are set in the target named range before calculation and data items in the target named range after calculation are obtained and stored as part of the named range triad.

For a named ranged triad that is configured as an input or an input-output named range triad, causing data items of the named range triad to be set 110 in the target named range using the synchronization metadata for the named range triad includes the following operations. The shape and contents of the row and column header named ranges and the shape of the target named range for the data items is determined from the spreadsheet. A table representation of the target named range is created (e.g., in main memory) having the same shape as the target data item named range. Ordinals are assigned to row headers of the named ranged triad and to column headers of the named range triad based on their position within the respective row or column named range of the spreadsheet. The row and column mappings and the ordinals assigned to the row and column headers of the named ranged triad are then used to assign data items of the named range triad to cells of the table representation. Finally, the table representation with the assigned data items is used to set the assigned data items in the target data item named range of the spreadsheet. This approach is flexible in that causing the assigned data items to be set 110 in the target data item named range can be performed successfully regardless of whether the data items of the named ranged triad are fully dense or sparse and/or over dense. Further, the approach operates properly if a row and/or column header named ranges of the spreadsheet contains different (more or fewer) headers that the set of respective row or column headers of the named ranged triad.

Example Spreadsheet

Figure 4:
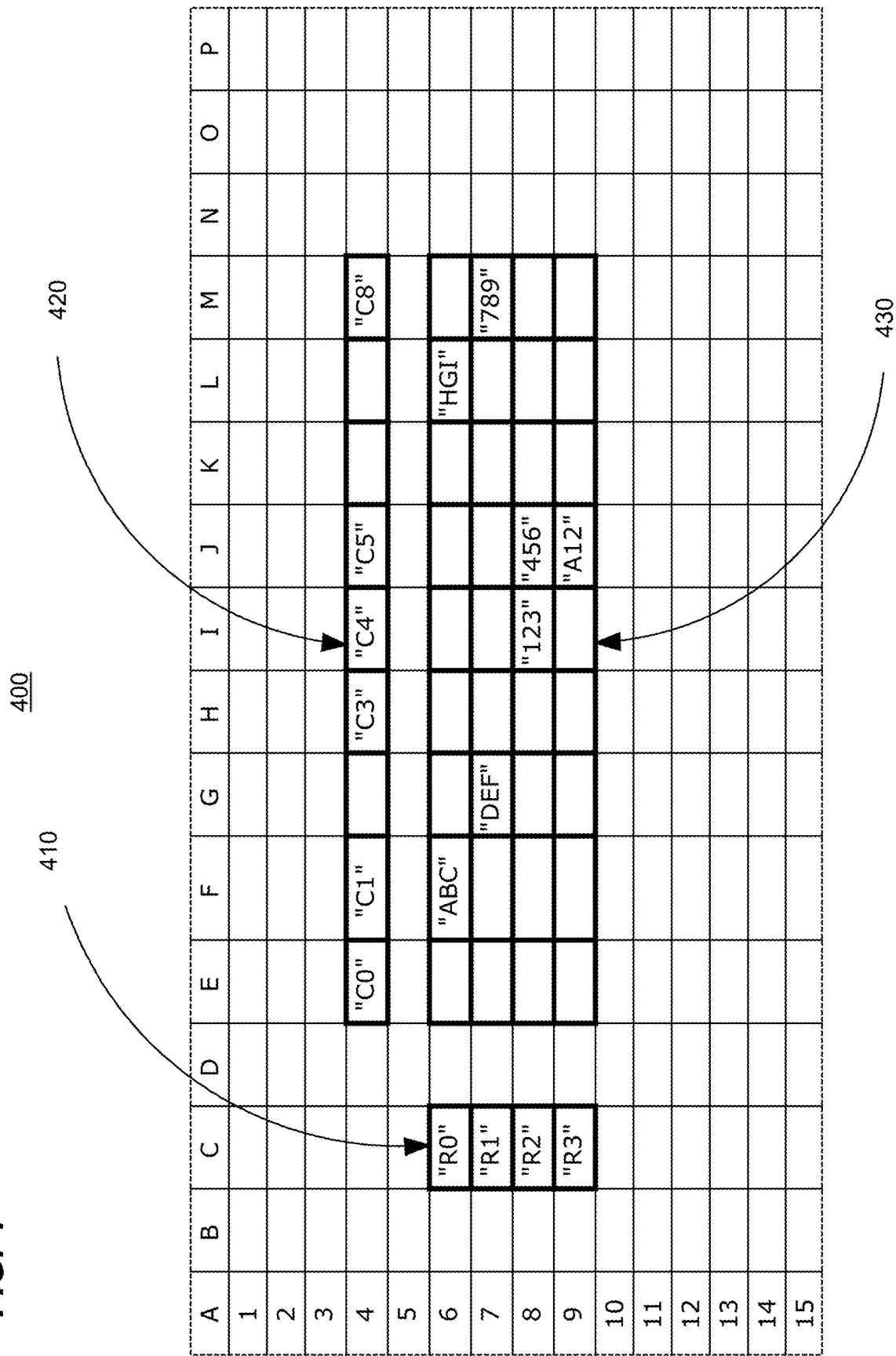
FIG. 4 depicts an example spreadsheet.

FIG. 4 depicts an example spreadsheet 400 for using a spreadsheet as a compute engine in an online data management system. The spreadsheet 400 contains a row header named range 410, a column header named range 420, and a data item named range 430. The shape and contents of the row header named range 410 and the column header named range 420 may be obtained using their respective identifiers 310 and 320 of the synchronization metadata 300 for a given named range triad. For example, an application program interface of a spreadsheet program that is configured to operate on the spreadsheet 400 may be used to obtain the shape and contents of named ranges 410 and 420. Similarly, the shape of data item named range 430 may be obtained using the data item named range identifier 330 of the metadata 300 for the given named range triad.

In this example, example values in cells of the spreadsheet are provided in double quotes. The example values are provided for purposes of illustration and are not intended to be limiting. It should be understood that in practice these values may vary from named ranged to named range and from spreadsheet to spreadsheet and can be other than the values depicted in the example of FIG. 4. Further, the values may be in various different data formats including strings, numbers, percentages, dates, etc.

Example Named Range Triad

Figure 5:
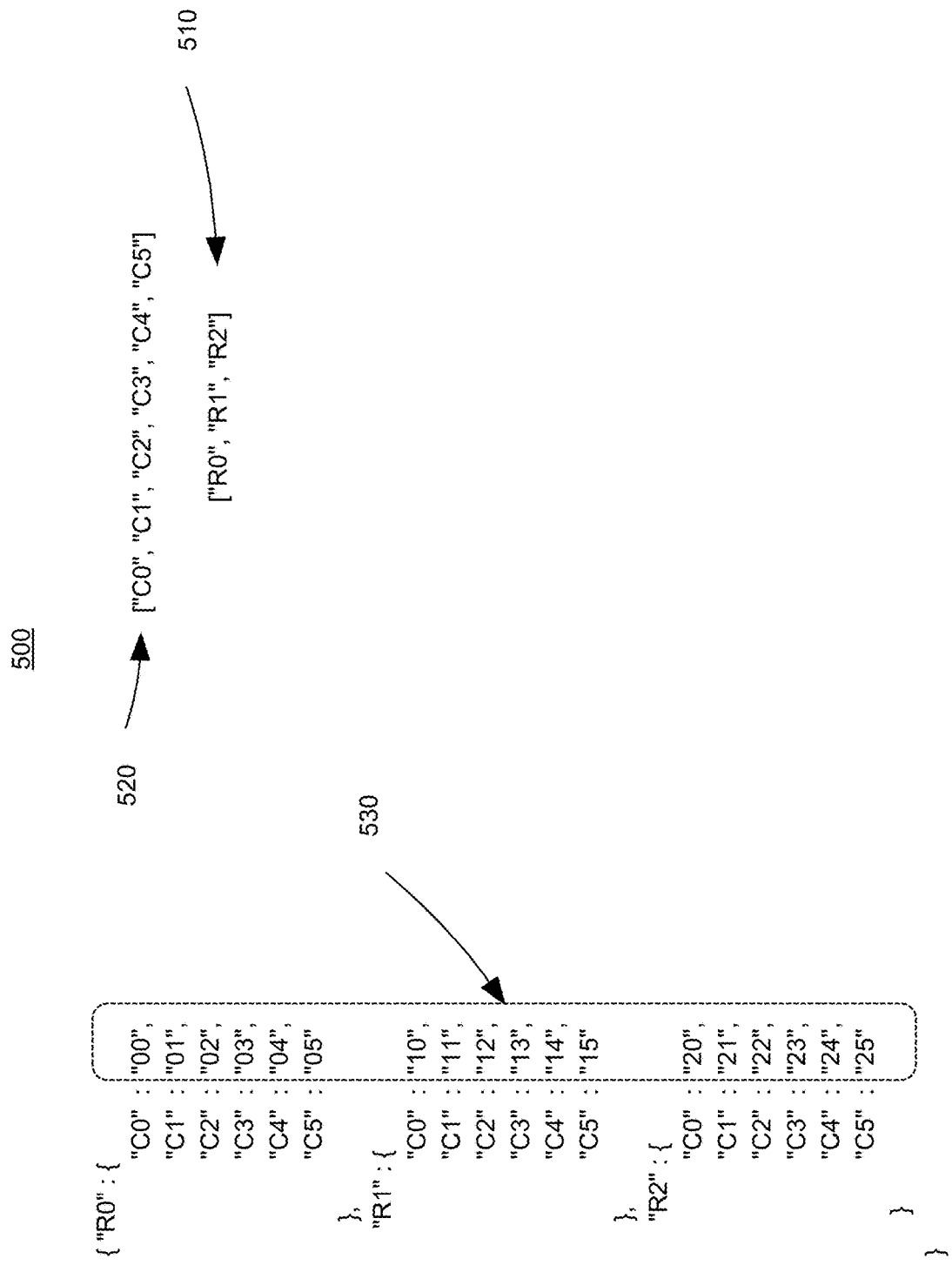
FIG. 5 depicts an example named range triad.

FIG. 5 depicts an example named range triad 500 for input to spreadsheet 400 of FIG. 4. The example named range triad 500 includes row headers 510, column headers 520, and a data items 530. In this example, the components of the named range triad 500 are represented in JSON format. However, other formats could be used (e.g., XML). The JSON format also includes row and column header mappings for each of the data items 530. For example, data item "00" is mapped to row header "R0" and column header "C0".

In this example of FIG. 5, example values are provided in double quotes. The example values are provided for purposes of illustration and are not intended to be limiting. It should be understood that in practice these values may vary from named ranged triad to named range triad and can be other than the values depicted in the example of FIG. 5. Further, the values may be in various different data formats including strings, numbers, percentages, dates, etc.

As mentioned, a named ranged triad like named ranged triad 500 of FIG. 5 may be associated with synchronization metadata 300 to facilitate named range-based synchronization with a spreadsheet like spreadsheet 400 of FIG. 4. For example, the row header named range identifier 310 may be used to determine the shape of and obtain a copy of the row header named range 410. The column header named ranger identifier 320 may be used to determine the shape of and obtain a copy of the column header named range 420. And the data item named range identifier 330 may be used to determine the shape of the data item named range 430. For this, an application programming interface of a spreadsheet program that is configured to operate on the spreadsheet may be used.

Ordinals may then be assigned to the row headers 510 and the column headers 520 on the named ranged triad 500 based on their positions in the respective copies of row or column named ranges. For example, the row headers 510 may be assigned the following ordinals:

| Row Header 510 of Triad 500 of FIG. 5 | Ordinal |
|---|---|
| "R0" | 0 |
| "R1" | 1 |
| "R2" | 2 |

In the above example, row header "RO" of the triad 500 is assigned ordinal 0 because it is the first ordered row header in the row header named range 410 (assuming the count starts at 0), row header "R1" of the triad 500 is assigned ordinal 1 because it is the second row header in the row header named range 410, row header "R2" of the triad 500 is assigned ordinal 2 because it is the third row header in the row header named range 410. Note that row header "R3" in the row header named range 410 is not assigned an ordinal because it is not one of the row headers 510 of the triad 500.

The column headers of the triad may be assigned ordinals similarly with respect to their order in the column header named range of the spreadsheet. For example, the column headers 520 may be assigned the following ordinals based on column header named range 420 as follows:

| Column Header 520 of Triad 500 of FIG. 5 | Ordinal |
|---|---|
| "C0" | 0 |
| "C1" | 1 |
| "C2" | |
| "C3" | 3 |
| "C4" | 4 |
| "C5" | 5 |

In the above example, it should be noted that column header "C2" of triad 500 is not assigned an ordinal because that column header is not present in the column header named range 420. Column header "C3" of triad 500 is assigned order 3 because that column header is the fourth column header in the column header named range 420 (assuming the count starts at 0). The column header "C8" of the named range 420 is also not assigned an ordinal because that column header is not one of the columns headers 520 of the triad 500.

Example Table Representation of a Data Item Named Range

Figure 6:
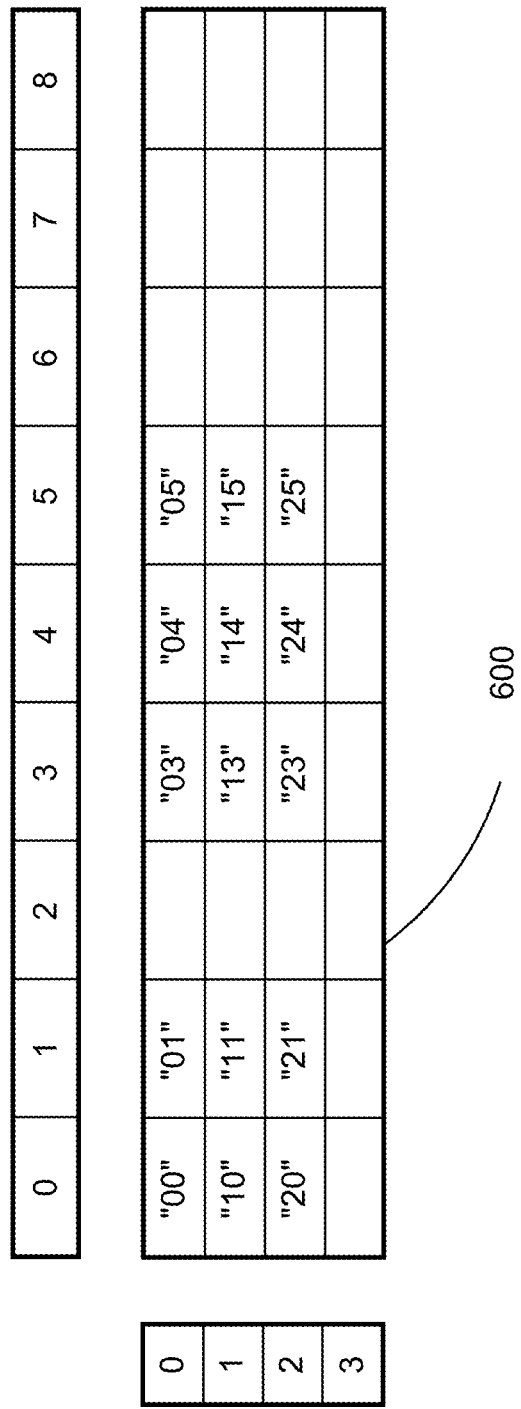
FIG. 6 depicts an example table representation of a data item named range of a spreadsheet.

FIG. 6 depicts an example table representation 600 of the data item named range 430 of FIG. 4. The table representation 600 may be stored in main memory, for example. The table representation 600 has the same shape as the determined data item named range 430. Namely, both table representation 600 and the data item named range 430 have a shape of four rows by nine columns. The table representation 600 also reflects assignment of the data items 530 of triad 500 of FIG. 5 according to the row and header column mappings associated with the triad 500 and depicted in FIG. 5 and according to the ordinals assigned to the row headers 510 and columns headers 520. It should be noted that no data items are assigned to the columns 2, 6, 7, and 8 or row 3 of table representation 600 because of the row and header column mappings and the row and column header ordinal assignments.

Example Spreadsheet

FIG. 7 depicts the example spreadsheet 400 of FIG. 4 after the data items assigned to cells of the table representation 600 are caused to be set in the data item named range 430. As can be seen, some of the cell values in the resulting named range 730 have been overwritten by values set in the named range 430. Other values that existed in cells within the named range 430 to which data items of the triad 500 were not assigned remain in the resulting named range 730 after the set operation (i.e., were not overwritten by the set operation). The row headers 710 and the column headers 720 are unchanged by the set operation.

Now that data items of the input named range triad(s) have been set in the respective data item named range(s) of the spreadsheet, a spreadsheet program configured to operate on the spreadsheet is caused to calculate 120 derived cells of the spreadsheet. Such derived cells may include cells that refer (e.g., with a formula) to cells set 110 above. In some embodiments, an application programming interface of the spreadsheet program is used to cause the spreadsheet program to calculate all formulas of the spreadsheet. This causes any derived cells of the spreadsheet to be updated in the spreadsheet according to the calculation of the formulas.

After derived cells of the spreadsheet are caused to be calculated 120, data items are obtained 130 from any data item named ranges of the spreadsheet that corresponding to respective output (or input-output) named range triads. Obtaining 130 data items from a data item named range of a spreadsheet operates similar to setting 110 data items into a data item named range of a spreadsheet in that a table representation of the data item named range is used. Ordinals assigned to row and column headers of the named range triad are used to assign data items from the data item named range of the spreadsheet to cells of the table representation. The row and column header mappings for the named range triad are then used to store data items assigned to the table representation in the data repository as part of the named range triad.

Example Spreadsheet and Example Named Range Triads

Figure 9:
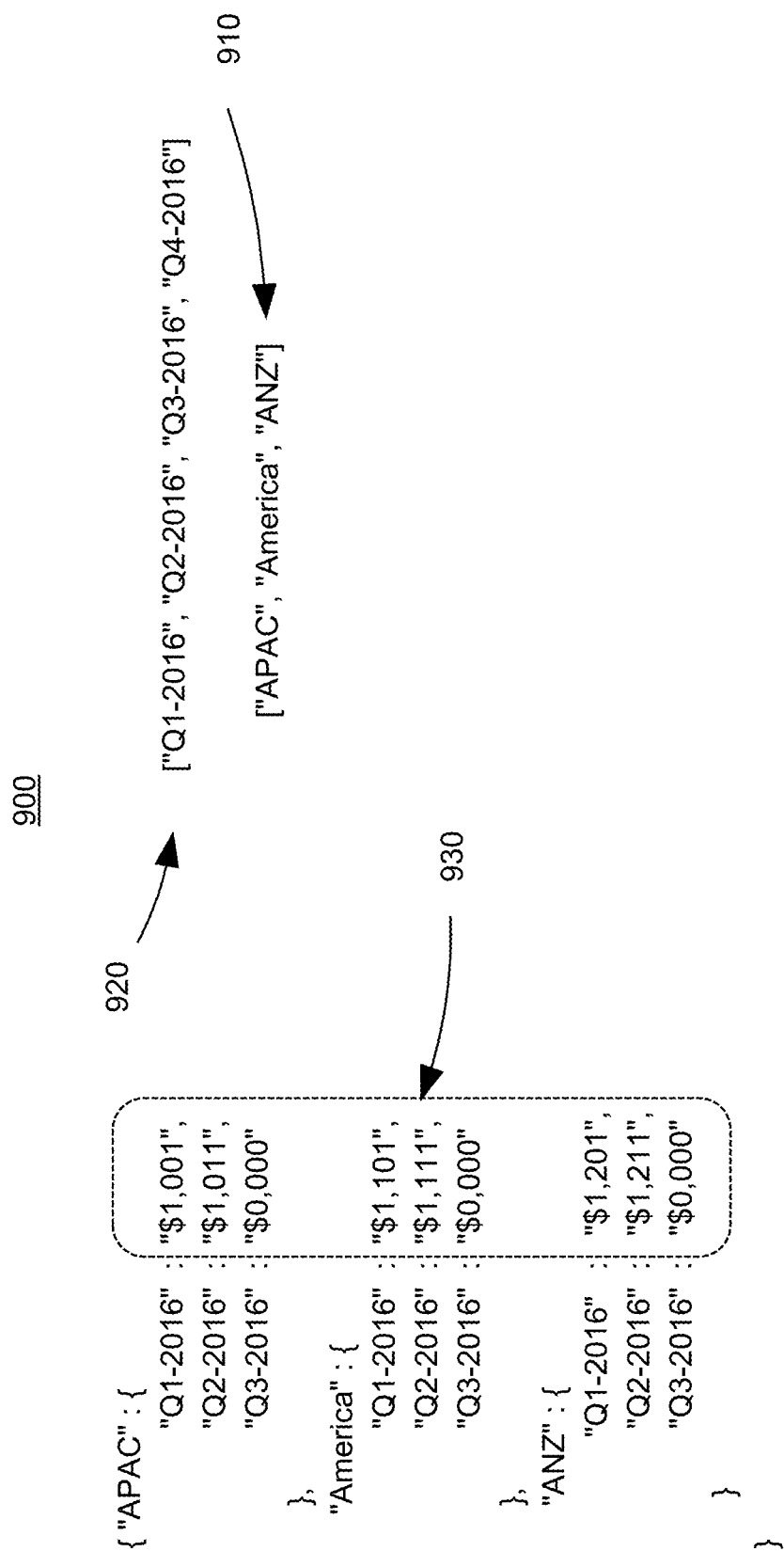
FIG. 9 depicts an example named range triad.
Figure 10:
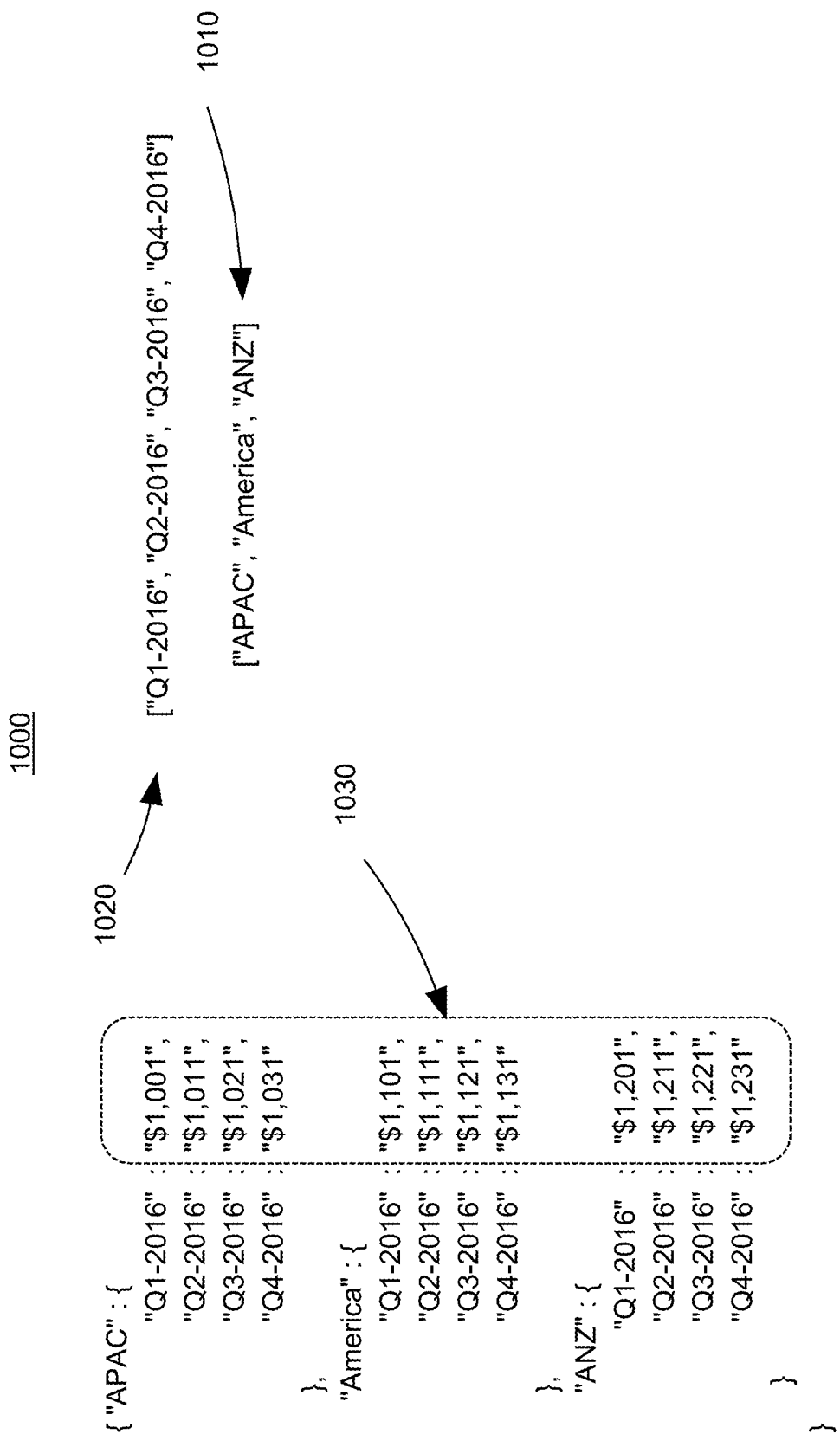
FIG. 10 depicts an example named range triad.

FIG. 8 depicts an example spreadsheet 800 after operations 110 and 120 of process 100 have been performed on the spreadsheet 800. The spreadsheet 800 includes row header named range 810, column header named range 820, and data item named range 830. FIG. 9 depicts an example named range triad 900 corresponding to named ranges 810, 820, and 830 of spreadsheet 900 before operation 130 of process 100 have been performed on the spreadsheet. The named range triad 900 includes a set of row headers 910, a set of column headers 920, and a set of data items 930. Note that since the column headers 920 of the triad 900 does not include "Q1-2017", the values in the data named range 830 in that column will not be obtained 130 during the operation. It should also be noted that the data items 930 of the triad 900 does not include any data items for the "Q4-2016" column header or the "Q1-2017" column header. FIG. 10 depicts the example named range triad 900 after performance of operation 130 of process on the spreadsheet. As can been seen, as a result performing the operation 130 with respect to spreadsheet 800 of FIG. 8 and triad 900 of FIG. 9, the row headers 1010 and the column headers 1020 of the triad 1000 are unchanged. However, the set of data items 1030 of the triad 100 have been updated to include updated values for the "Q3-2016" column header and to add values for the "Q4-2016" column header.

After data items have been obtained 130 from data item named range(s) of a spreadsheet for respective named range triad(s), the named range triad(s) may be stored 140 in the data repository. For example, triad 1000 may be stored in the data repository after operation 130 is performed.

System Overview

Figure 11:
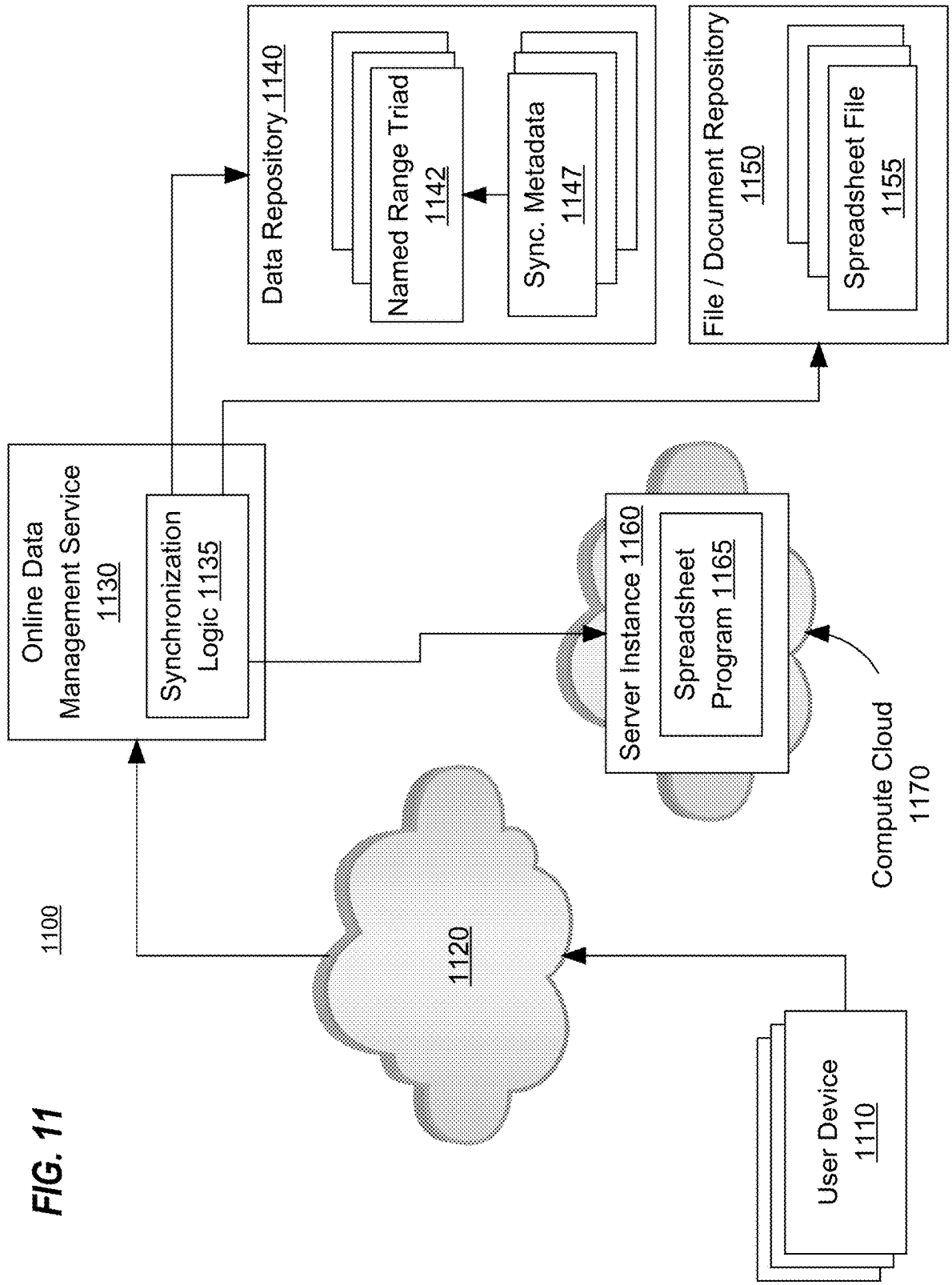
FIG. 11 depicts example systems for using a spreadsheet as a compute engine in an online data management system.

FIG. 11 depicts an example computing system environment 1100 for using a spreadsheet as a compute engine in an online data management system. System 1100 includes elements connected by a communicative coupling or network 1120 (e.g., a LAN, a WAN, the Internet). In some embodiments, the process 100 of FIG. 1 may be implemented computer-executed logic 1135 of an online data management service 1130. For example, logic 1135 may be implemented as software, hardware, or a combination of hardware and software.

Users devices 1110 interact with online data management service 1130 over network 1120 to carry out various data management operations involving named range triads 1142 stored in a data repository 1140 accessible to the online data management service 1130 computing system. Such operations may include modifying named range triads 1142 stored in the data repository 1140, requesting a visual report or other visual presentation (e.g., presented in a web browser at the user device 110) based on data of named range triads 1142, and/or invoking synchronization process 100 of FIG. 1 for a particular spreadsheet file 1155 stored in file/document repository 1150. File/document repository 1150 may store multiple spreadsheet files 1155. Data repository 1140 may also store synchronization metadata 1150 for the named range triads 1150.

When performing synchronization process 100 on a particular spreadsheet file 1155, logic 1135 may use a server instance 1160 configured with a spreadsheet program 1165 for operating on the particular spreadsheet file 1155. The server instance 1160 may be provided by a virtual machine instance in a compute cloud 1170. For example, the virtual machine instance may be provided by the Amazon™ Elastic Compute Cloud™. Logic 1135 may interact with the spreadsheet program 1165 (e.g., Microsoft™ Excel™) via the server instance 1160 including providing the particular spreadsheet file 1155 to the spreadsheet program 1165 executing on the server instance 1160 and interacting with an application programming interface of the executing spreadsheet program 1165 to carry out the synchronization including read from and/or writing to named ranges of the particular spreadsheet file 1155 and causing the spreadsheet program 1165 to calculate formulas and derived values of the particular spreadsheet file 1155.

Hardware Overview

According to some embodiments, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 12:
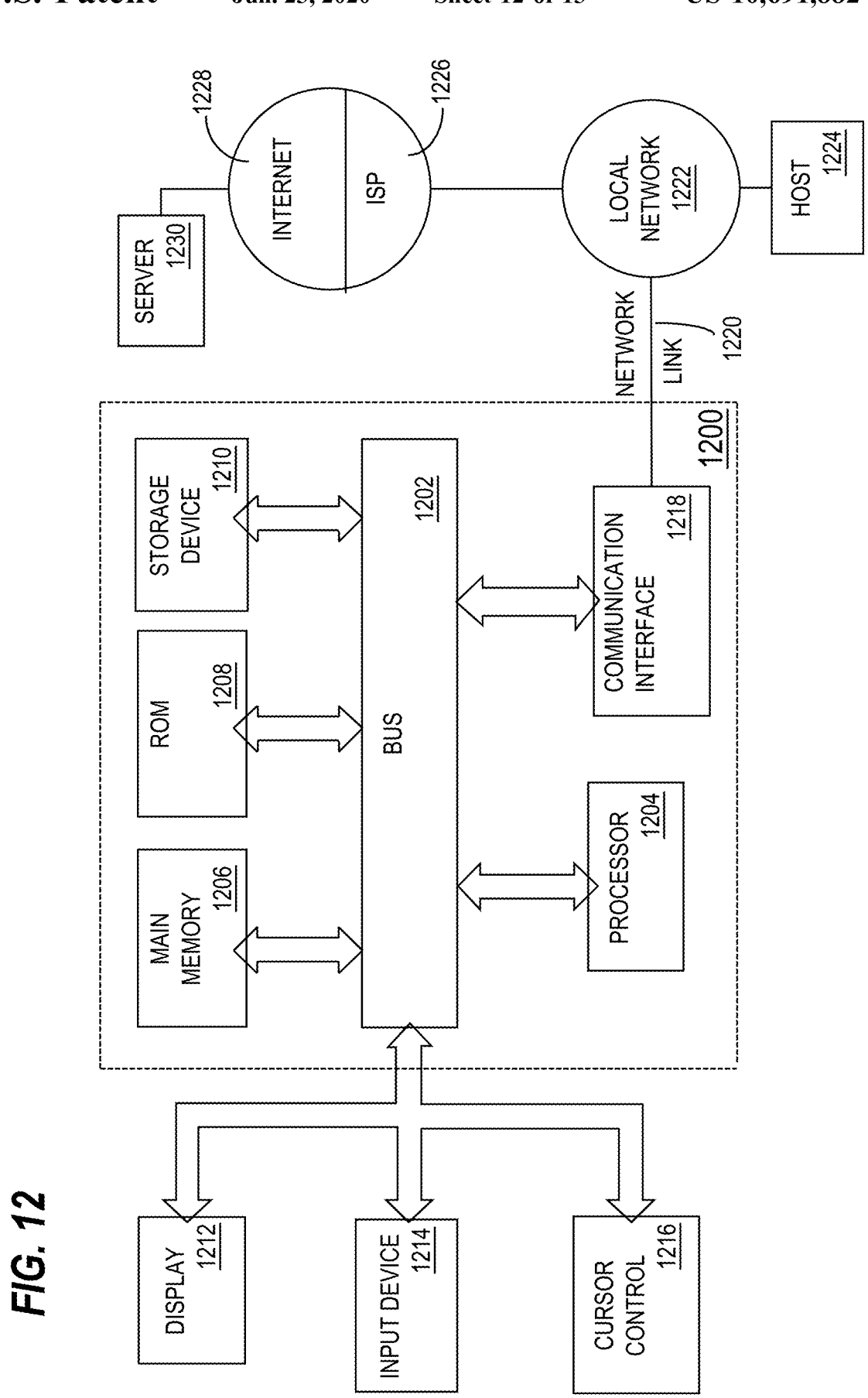
FIG. 12 depicts example systems and hardware for using a spreadsheet as a compute engine in an online data management system.

For example, FIG. 12 is a block diagram that illustrates a computer system 1200 upon which an embodiment of the invention may be implemented. Computer system 1200 includes a bus 1202 or other communication mechanism for communicating information, and a hardware processor 1204 coupled with bus 1202 for processing information. Hardware processor 1204 may be, for example, a general-purpose microprocessor.

Computer system 1200 also includes a main memory 1206, such as a random-access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Such instructions, when stored in non-transitory storage media accessible to processor 1204, render computer system 1200 into a special-purpose machine that is customized to perform the operations specified in the instructions.

Computer system 1200 further includes a read only memory (ROM) 1208 or other static storage device coupled to bus 1202 for storing static information and instructions for processor 1204. A storage device 1210, such as a magnetic disk, optical disk, or solid-state drive is provided and coupled to bus 1202 for storing information and instructions.

Computer system 1200 may be coupled via bus 1202 to a display 1212, such as an OLED, LED or cathode ray tube (CRT), for displaying information to a computer user. In some embodiments, the display 1212 includes or is a virtual reality headset, such as a head-mounted display or an augmented reality display. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane. The input device may also have more than two degrees of freedom. For example, input device 1214 may be a six degree-of-freedom input device that allows movement and rotations in each of three dimensions. The input device 1214 may also have multiple input modalities, such as multiple 2-axes controllers, and/or input buttons or keyboard. This allows a user to input along more than two dimensions simultaneously and/or control the input of more than one type of action.

Computer system 1200 may implement the techniques described herein using customized hard-wired logic, one or more ASICs or FPGAs, firmware and/or program logic which in combination with the computer system causes or programs computer system 1200 to be a special-purpose machine. According to some embodiments, the techniques herein are performed by computer system 1200 in response to processor 1204 executing one or more sequences of one or more instructions contained in main memory 1206. Such instructions may be read into main memory 1206 from another storage medium, such as storage device 1210. Execution of the sequences of instructions contained in main memory 1206 causes processor 1204 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1210. Volatile media includes dynamic memory, such as main memory 1206. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or solid-state drive of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card, cable modem, satellite modem, or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information. Such a wireless link could be a Bluetooth, Bluetooth Low Energy (BLE), 802.11 WiFi connection, or the like.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world-wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are example forms of transmission media.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code may be executed by processor 1204 as it is received, and/or stored in storage device 1210, or other non-volatile storage for later execution.

Software Overview

Figure 13:
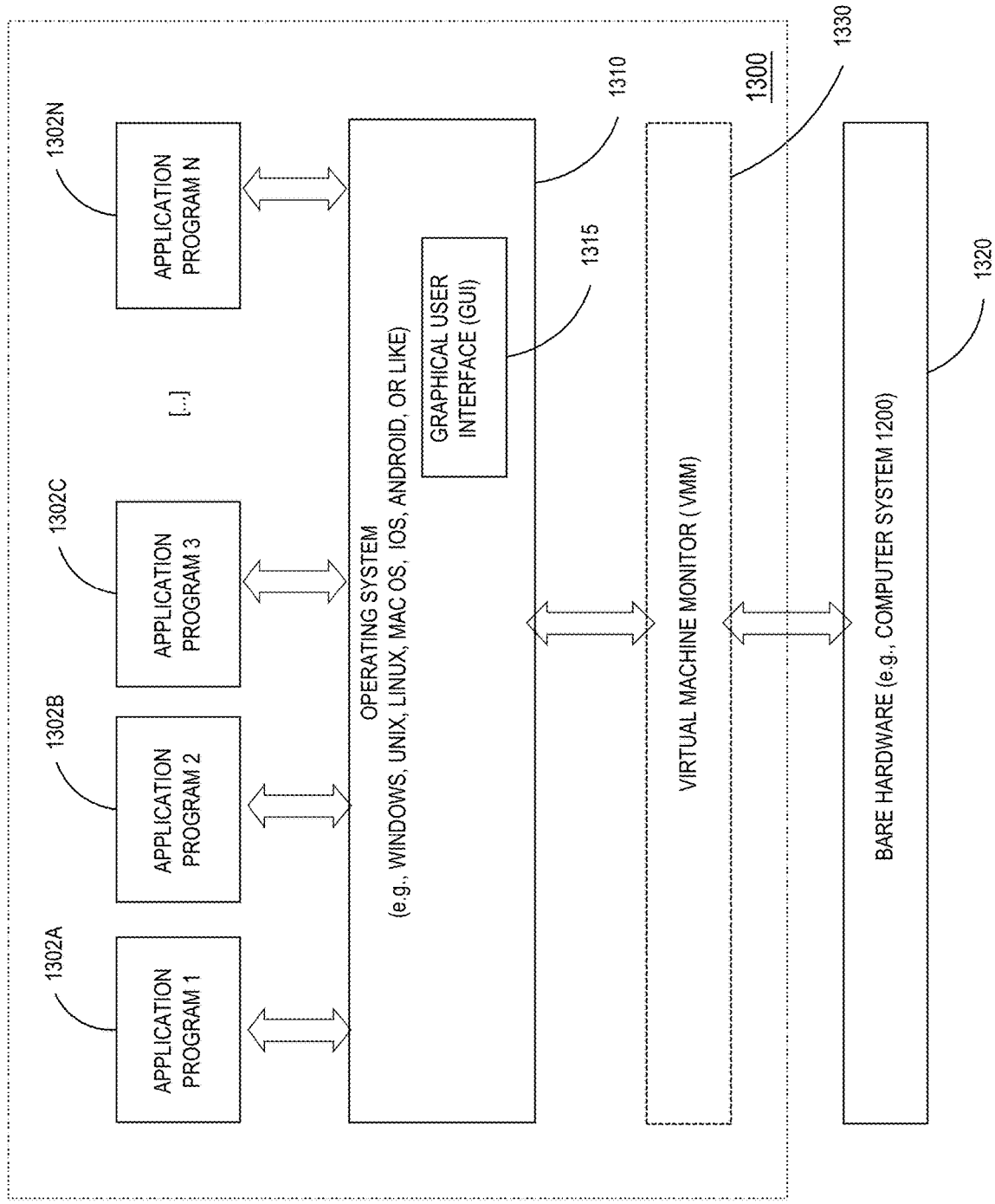
FIG. 13 depicts example systems and software for using a spreadsheet as a compute engine in an online data management system

FIG. 13 is a block diagram of a basic software system 1300 that may be employed for controlling the operation of computer system 1200. Software system 1300 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1300 is provided for directing the operation of computer system 1200. Software system 1300, which may be stored in system memory (RAM) 1206 and on fixed storage (e.g., hard disk or flash memory) 1210, includes a kernel or operating system (OS) 1310.

The OS 1310 manages low-level aspects of computer operation, including managing execution of processes, memory allocation, file input and output (I/O), and device I/O. One or more application programs, represented as 1302A, 1302B, 1302C . . . 1302N, may be "loaded" (e.g., transferred from fixed storage 1210 into memory 1206) for execution by the system 1300. The applications or other software intended for use on computer system 1200 may also be stored as a set of downloadable computer-executable instructions, for example, for downloading and installation from an Internet location (e.g., a Web server, an app store, or other online service).

Software system 1300 includes a graphical user interface (GUI) 1315, for receiving user commands and data in a graphical (e.g., "point-and-click" or "touch gesture") fashion. These inputs, in turn, may be acted upon by the system 1300 in accordance with instructions from operating system 1310 and/or application(s) 1302. The GUI 1315 also serves to display the results of operation from the OS 1310 and application(s) 1302, whereupon the user may supply additional inputs or terminate the session (e.g., log off).

OS 1310 can execute directly on the bare hardware 1320 (e.g., processor(s) 1204) of computer system 1200. Alternatively, a hypervisor or virtual machine monitor (VMM) 1330 may be interposed between the bare hardware 1320 and the OS 1310. In this configuration, VMM 1330 acts as a software "cushion" or virtualization layer between the OS 1310 and the bare hardware 1320 of the computer system 1200.

VMM 1330 instantiates and runs one or more virtual machine instances ("guest machines"). Each guest machine comprises a "guest" operating system, such as OS 1310, and one or more applications, such as application(s) 1302, designed to execute on the guest operating system. The VMM 1330 presents the guest operating systems with a virtual operating platform and manages the execution of the guest operating systems.

In some instances, the VMM 1330 may allow a guest operating system to run as if it is running on the bare hardware 1320 of computer system 1200 directly. In these instances, the same version of the guest operating system configured to execute on the bare hardware 1320 directly may also execute on VMM 1330 without modification or reconfiguration. In other words, VMM 1330 may provide full hardware and CPU virtualization to a guest operating system in some instances.

In other instances, a guest operating system may be specially designed or configured to execute on VMM 1330 for efficiency. In these instances, the guest operating system is "aware" that it executes on a virtual machine monitor. In other words, VMM 1330 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. A method for using a spreadsheet as a compute engine in an online data management system, the method performed by a computing system comprising one or more processors and storage media storing one or more programs, the one or more programs comprising instructions executed by the one or more processors to perform the method, the method comprising:
   automatically making assignments of a first set of data items, of a first named range triad, to cells of a table representation of a first named range of a spreadsheet file, the first named range triad having a first shape and the table representation having a second shape, the second shape having a same shape as the first named range of the spreadsheet file;
   wherein the first named range triad comprises a set of row headers, a set of column headers, and a set of row and column header mappings;
   wherein the set of row and column header mappings of the first named range triad map each data item of the first set of data items to a respective row header of the set of row headers and a respective column header of the set of column headers;

wherein the first named range triad comprises a particular data item that is not included in the first set of data items;

in response to determining that the first shape is different than the second shape, not assigning the particular data item to a cell of the table representation;

based on the automatically making assignments of the first set of data items to cells of the table representation, automatically causing the first set of data items of the first named range triad to be set in the first named range of a spreadsheet file, the first named range triad stored external to the spreadsheet file;

after the first set of data items are set in the first named range, automatically causing a spreadsheet program to calculate a cell value of the spreadsheet file that is derived from one or more data items of the first set of data items as set in the first named range of the spreadsheet file; and after the cell value is calculated, automatically obtaining a second set of data items from the first named range of the spreadsheet file, the second set of data items including the cell value calculated.

2. The method of claim 1, further comprising:
automatically storing the second set of data items as part a second named range triad.

3. The method of claim 1, further comprising:
automatically modifying one or more data items of the first set of data items resulting in a modified set of first data items of the first named range triad; and
automatically causing the modified set of first data items to be set in the first named range of the spreadsheet file.

4. The method of claim 1, further comprising:
simultaneous to the first named range triad being stored in a data repository external to the spreadsheet file, automatically performing all of the following: (a) automatically causing the first set of data items of the first named range triad to be set in the first named range of the spreadsheet file, (b) the automatically causing the spreadsheet program to calculate the cell value of the spreadsheet file, and (c) the automatically obtaining the second set of data items from the first named range of the spreadsheet file.

5. The method of claim 1, wherein the automatically making assignments of the first set of data items to cells of the table representation is based on:
assigning a respective ordinal to each row header of the set of row headers based on a position of a corresponding row of the first named range associated with the row header,
assigning a respective ordinal to each column header of the set of column headers based on a position of a corresponding column of the first named range associated with the column header, and
assigning each data item of the first set of data items to a cell of the table representation based on the respective ordinal of the respective row header of the data item and based on the respective ordinal of the respective column header of the data item.

6. A computing system for using a spreadsheet as a compute engine in an online data management system, the computing system comprising:

one or more processors;
storage media; and
one or more programs for execution by the one or more processors and stored in the storage media, the one or more programs comprising instructions configured for:
automatically making assignments of a first set of data items, of a first named range triad, to cells of a table representation of a first named range of a spreadsheet file, the first named range triad having a first shape and the table representation having a second shape, the second shape having a same shape as the first named range of the spreadsheet file;

wherein the first named range triad comprises a set of row headers, a set of column headers, and a set of row and column header mappings;

wherein the set of row and column header mappings of the first named range triad map each data item of the first set of data items to a respective row header of the set of row headers and a respective column header of the set of column headers;

wherein the first named range triad comprises a particular data item that is not included in the first set of data items;

in response to determining that the first shape is different than the second shape, not assigning the particular data item to a cell of the table representation;

based on the automatically making assignments of the first set of data items to cells of the table representation, automatically causing the first set of data items of the first named range triad to be set in the first named range of a spreadsheet file, the first named range triad stored external to the spreadsheet file;

after the first set of data items are set in the first named range, automatically causing a spreadsheet program to calculate a cell value of the spreadsheet file that is derived from one or more data items of the first set of data items as set in the first named range of the spreadsheet file; and after the cell value is calculated, automatically obtaining a second set of data items from the first named range of the spreadsheet file, the second set of data items including the cell value calculated.

7. The computing system of claim 6, the instructions further configured for:
automatically storing the second set of data items as part a second named range triad.

8. The computing system of claim 6, the instructions further configured for:
automatically modifying one or more data items of the first set of data items resulting in a modified set of first data items of the first named range triad; and
automatically causing the modified set of first data items to be set in the first named range of the spreadsheet file.

9. The computing system of claim 6, the instructions further configured for:
simultaneous to the first named range triad being stored in a data repository external to the spreadsheet file, automatically performing all of the following while the first named range triad is stored in a data repository external to the spreadsheet file: (a) automatically causing the first set of data items of the first named range triad to be set in the first named range of the spreadsheet file, (b) the automatically causing the spreadsheet program to calculate the cell value of the spreadsheet file, and (c) the automatically obtaining the second set of data items from the first named range of the spreadsheet file.

10. The computing system of claim 6, wherein the instructions configured for automatically making assignments of the first set of data items to cells of the table representation further comprise instructions configured for:
- assigning a respective ordinal to each row header of the set of row headers based on a position of a corresponding row of the first named range associated with the row header,
- assigning a respective ordinal to each column header of the set of column headers based on a position of a corresponding column of the first named range associated with the column header, and
- assigning each data item of the first set of data items to a cell of the table representation based on the respective ordinal of the respective row header of the data item and based on the respective ordinal of the respective column header of the data item.

11. A non-transitory computer-readable media storing one or more programs for using a spreadsheet as a compute engine in an online data management system, the one or more programs comprising instructions configured for:
- automatically making assignments of a first set of data items, of a first named range triad, to cells of a table representation of a first named range of a spreadsheet file, the first named range triad having a first shape and the table representation having a second shape, the second shape having a same shape as the first named range of the spreadsheet file;
- wherein the first named range triad comprises a set of row headers, a set of column headers, and a set of row and column header mappings;
- wherein the set of row and column header mappings of the first named range triad map each data item of the first set of data items to a respective row header of the set of row headers and a respective column header of the set of column headers;
- wherein the first named range triad comprises a particular data item that is not included in the first set of data items;
- in response to determining that the first shape is different than the second shape, not assigning the particular data item to a cell of the table representation;
- based on the automatically making assignments of the first set of data items to cells of the table representation, automatically causing the first set of data items of the first named range triad to be set in the first named range of a spreadsheet file, the first named range triad stored external to the spreadsheet file;
- after the first set of data items are set in the first named range, automatically causing a spreadsheet program to calculate a cell value of the spreadsheet file that is derived from one or more data items of the first set of data items as set in the first named range of the spreadsheet file; and
- after the cell value is calculated, automatically obtaining a second set of data items from the first named range of the spreadsheet file, the second set of data items including the cell value calculated.

12. The non-transitory computer-readable media of claim 11, the instructions further configured for:
- automatically storing the second set of data items as part a second named range triad.

13. The non-transitory computer-readable media of claim 11, the instructions further configured for:
- automatically modifying one or more data items of the first set of data items resulting in a modified set of first data items of the first named range triad; and
- automatically causing the modified set of first data items to be set in the first named range of the spreadsheet file.

14. The non-transitory computer-readable media of claim 11, the instructions further configured for:
- simultaneous to the first named range triad being stored in a data repository external to the spreadsheet file, automatically performing all of the following: (a) automatically causing the first set of data items of the first named range triad to be set in the first named range of the spreadsheet file, (b) the automatically causing the spreadsheet program to calculate the cell value of the spreadsheet file, and (c) the automatically obtaining the second set of data items from the first named range of the spreadsheet file.

15. The non-transitory computer-readable media of claim 11, wherein the automatically causing the spreadsheet program to calculate the cell value of the spreadsheet file is based on automatically invoking an application programming interface offered by the spreadsheet program.

16. The non-transitory computer-readable media of claim 11, the instructions further configured for:
- automatically storing the second set of data items as part a second named range triad;
- modifying the second set of data items of the second named range triad resulting a modified second set of data items of the second named range triad;
- automatically causing the modified second set of data items of the second named range triad to be set in a third named range of the spreadsheet file;
- after the modified second set of data items are set in the third named range of the spreadsheet file, automatically causing he spreadsheet program to calculate a cell value of the spreadsheet file that is derived from one or more data items of the modified second set of data items as set in the spreadsheet file.

17. The one or more non-transitory computer-readable media of claim 11, wherein the instructions configured for automatically making assignments of the first set of data items to cells of the table representation further comprise instructions configured for:
- assigning a respective ordinal to each row header of the set of row headers based on a position of a corresponding row of the first named range associated with the row header,
- assigning a respective ordinal to each column header of the set of column headers based on a position of a corresponding column of the first named range associated with the column header, and
- assigning each data item of the first set of data items to a cell of the table representation based on the respective ordinal of the respective row header of the data item and based on the respective ordinal of the respective column header of the data item.

* * * * *